United States Patent [19]

Namiki

[11] Patent Number: 4,704,642
[45] Date of Patent: Nov. 3, 1987

[54] NOISE REDUCTION CIRCUIT FOR REDUCING PULSE NOISE IN AUDIO SIGNAL REPRODUCED FROM A RECORDING MEDIUM

[75] Inventor: Yasuomi Namiki, Yokohama, Japan

[73] Assignee: Victor Company of Japan, Ltd., Tokyo, Japan

[21] Appl. No.: 857,845

[22] Filed: Apr. 30, 1986

[30] Foreign Application Priority Data

May 1, 1985 [JP] Japan .................................. 60-94275
May 11, 1985 [JP] Japan .................................. 60-100185

[51] Int. Cl.[4] .......................... G11B 15/14; G11B 5/02
[52] U.S. Cl. ......................................... 360/64; 360/67
[58] Field of Search ....................... 360/64, 61, 65, 67

[56] References Cited

U.S. PATENT DOCUMENTS 4,559,567 12/1985 Maruichi et al. ..................... 360/64

Primary Examiner—Vincent P. Canney
Attorney, Agent, or Firm—Michael N. Meller

[57] ABSTRACT

A noise reduction circuit is provided with a slew rate detection circuit for detecting a slew rate of a reproduced audio signal, and variably controls a pulse width of a hold signal depending on the detected slew rate. The noise reduction circuit successively produces the reproduced audio signal with a predicted level other than a level of pulse noise included in the reproduced audio signal during a time period corresponding to the pulse width of the hold signal, so as to obtain a reproduced audio signal in which the pulse noise has been eliminated.

15 Claims, 25 Drawing Figures

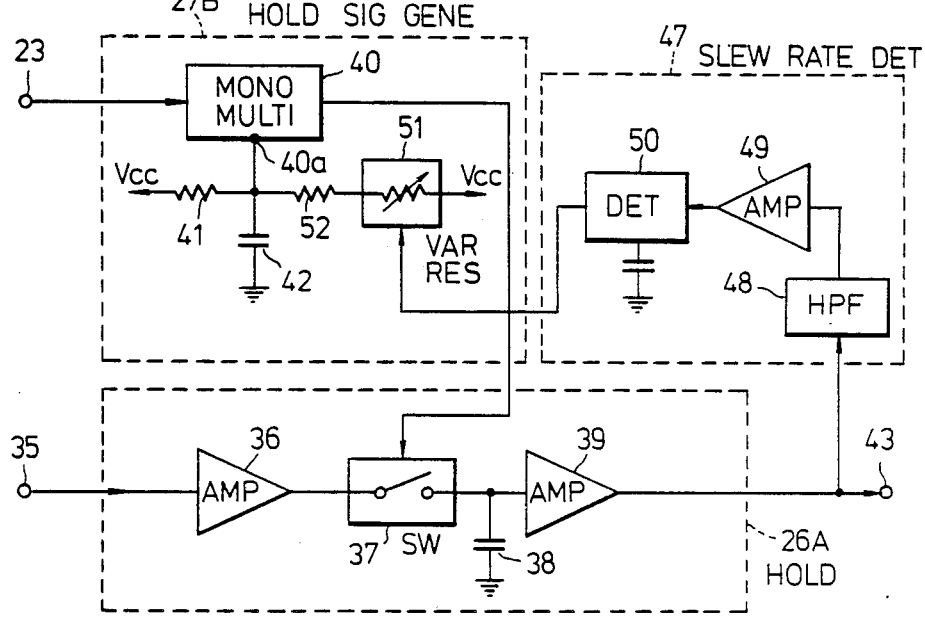
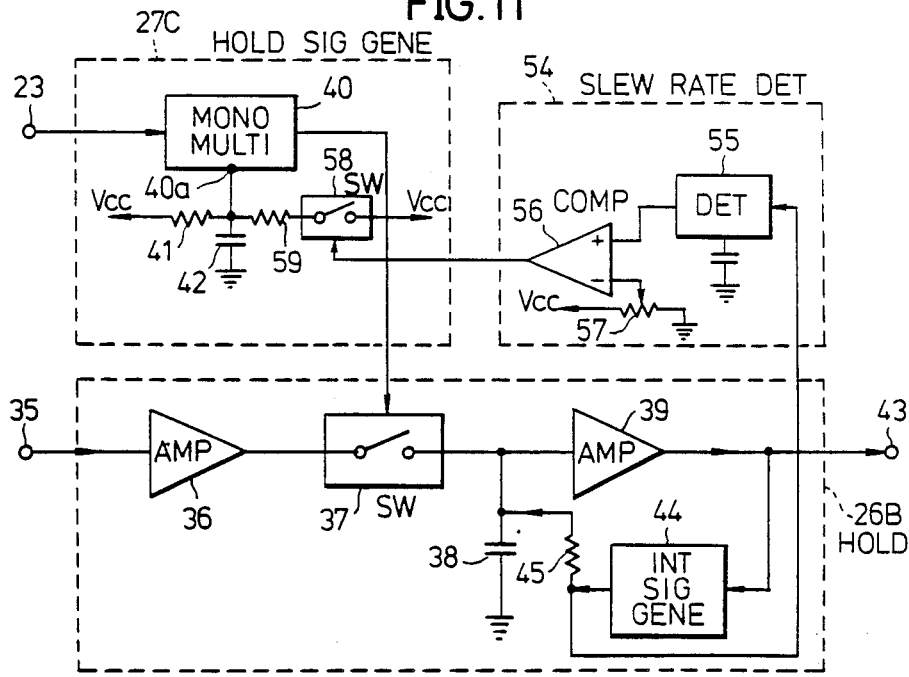

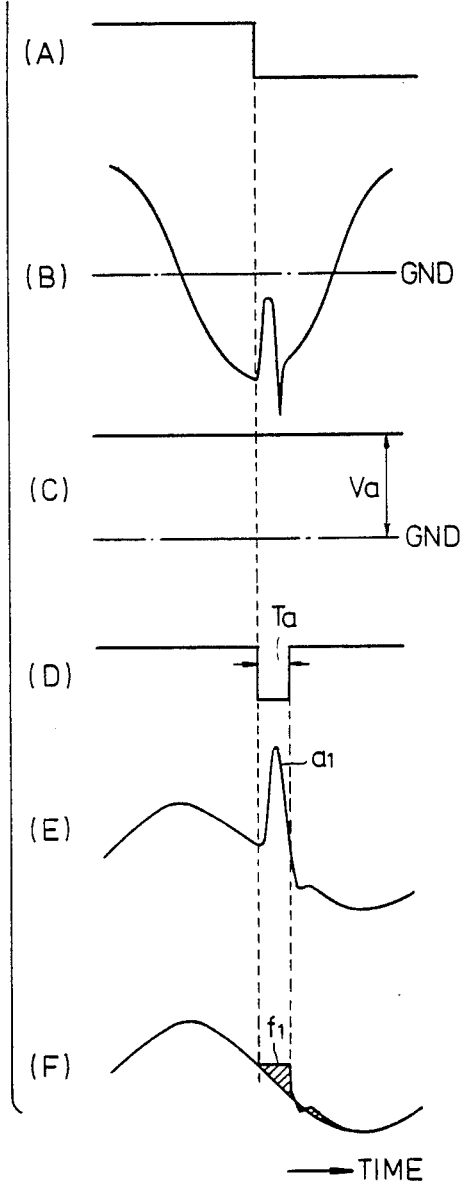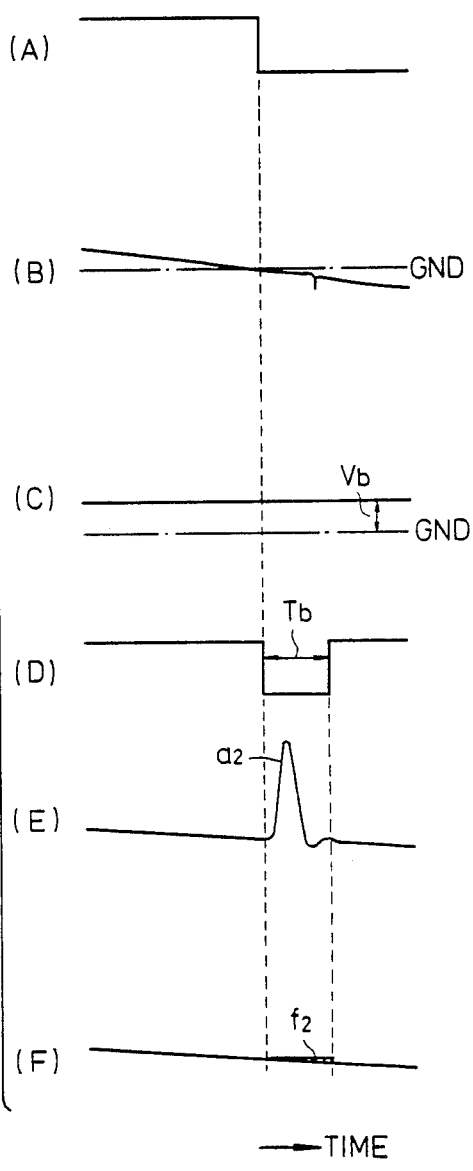

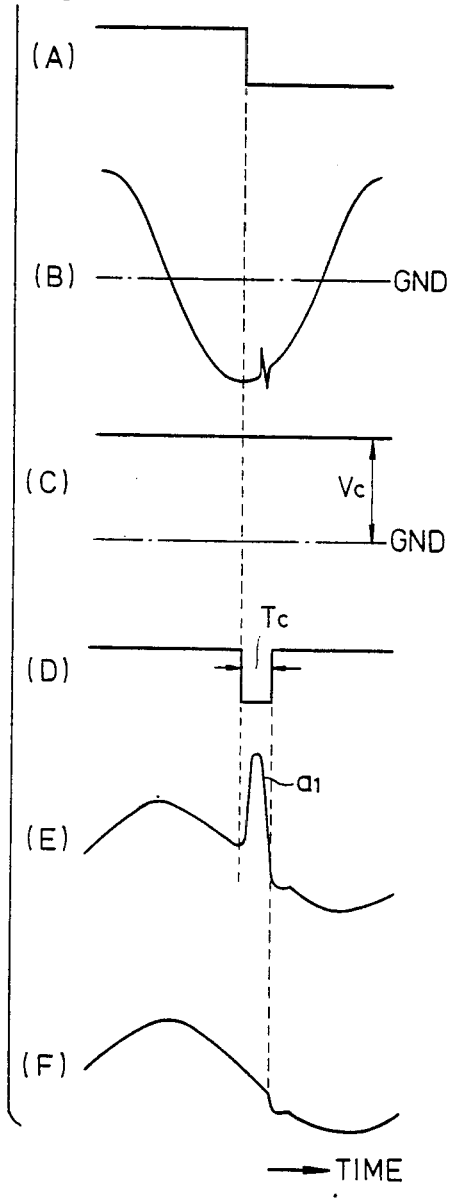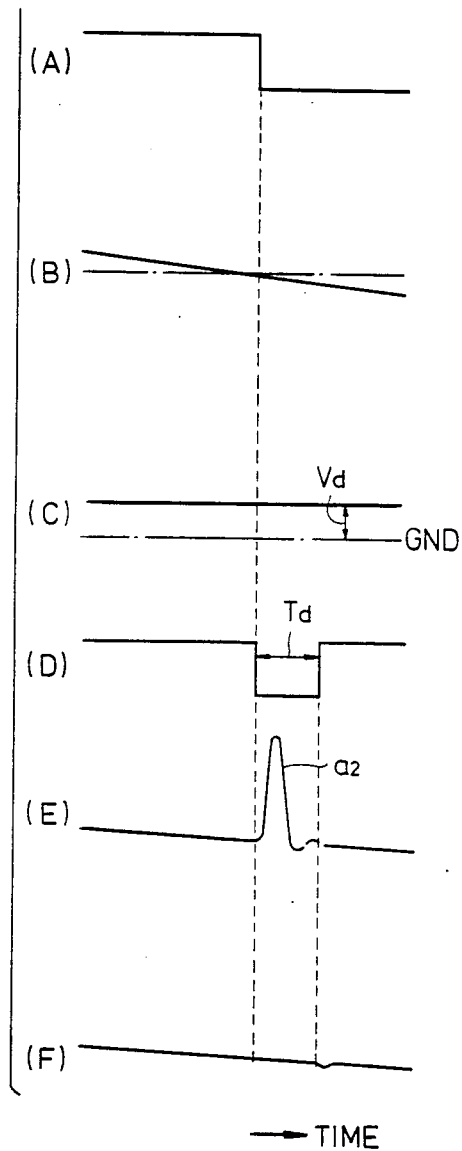

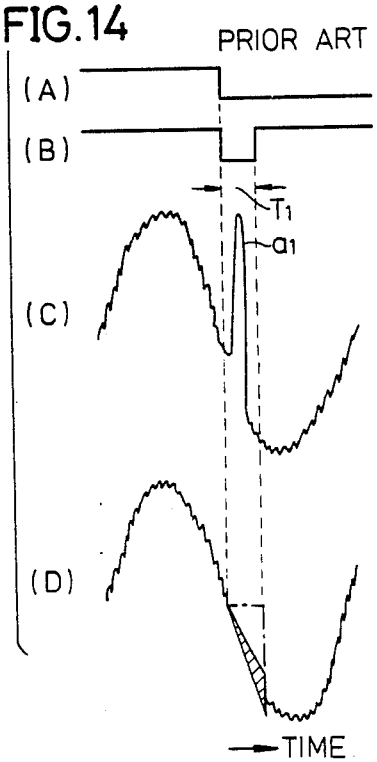
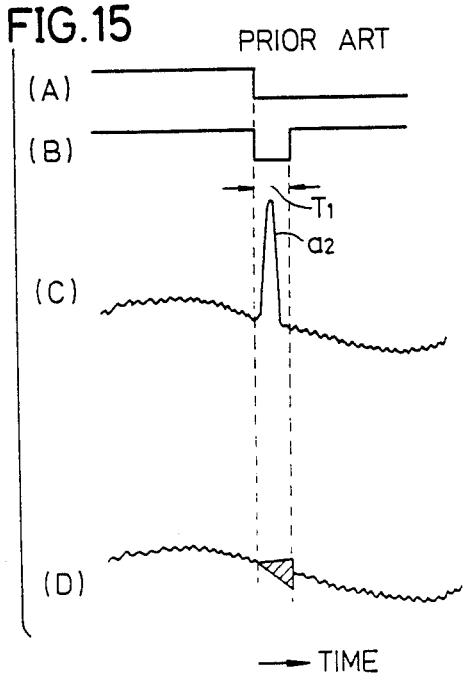
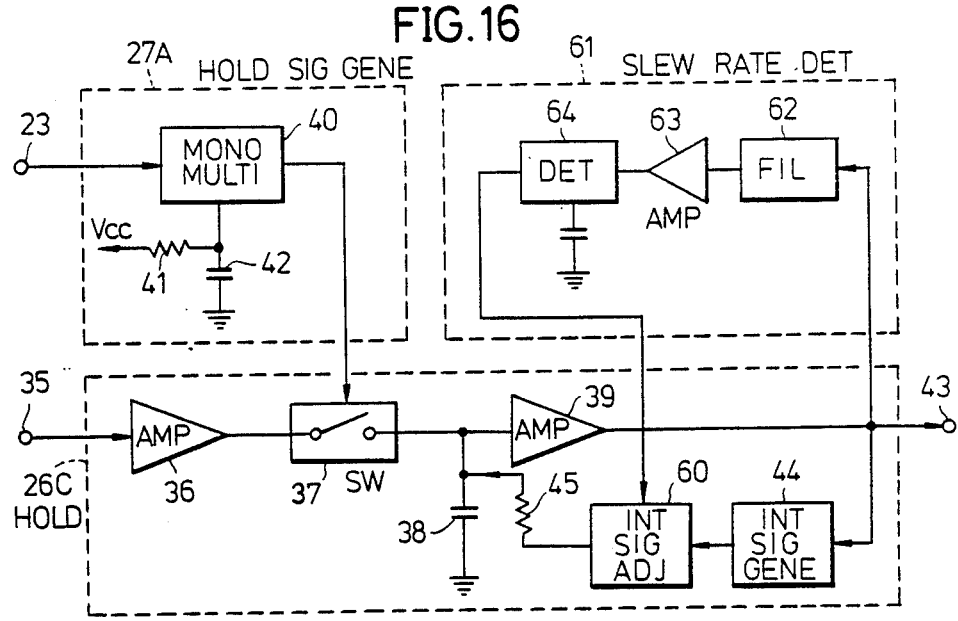

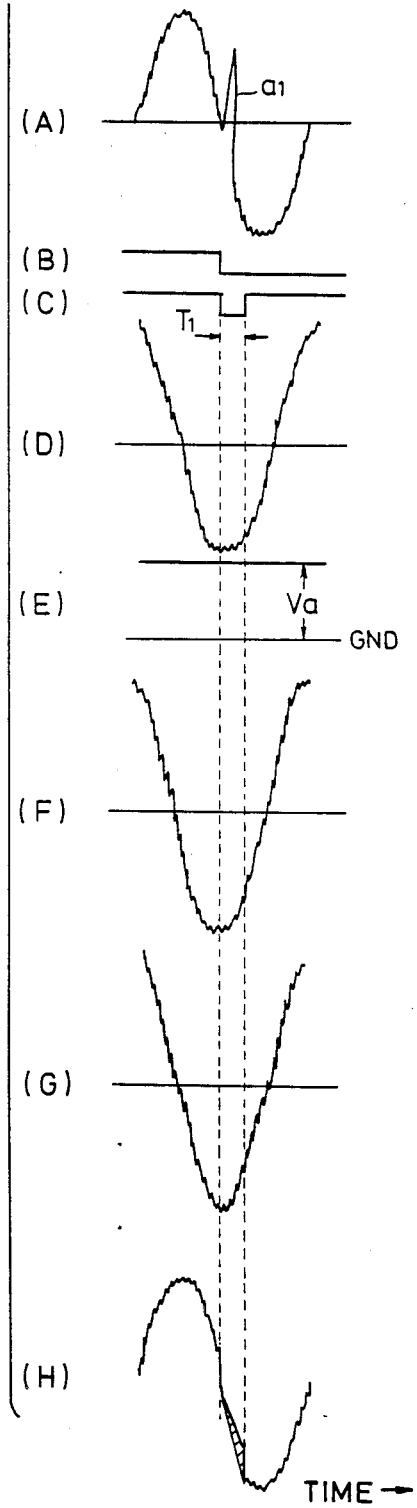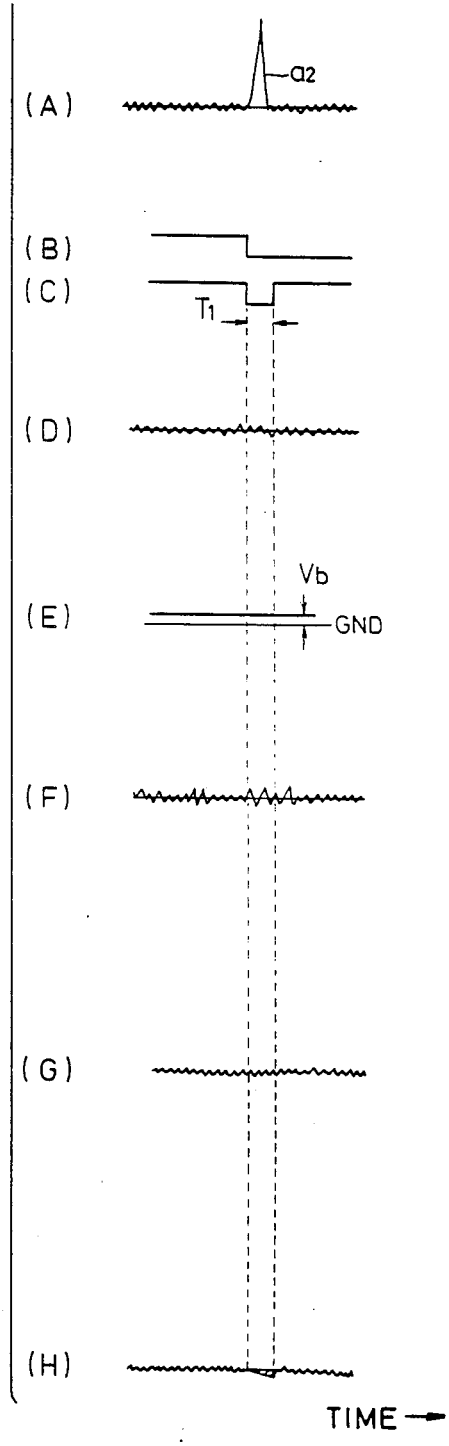

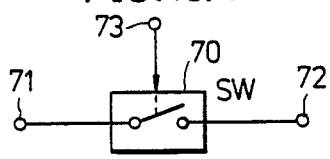
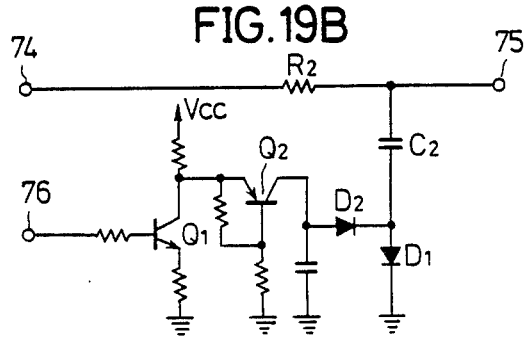
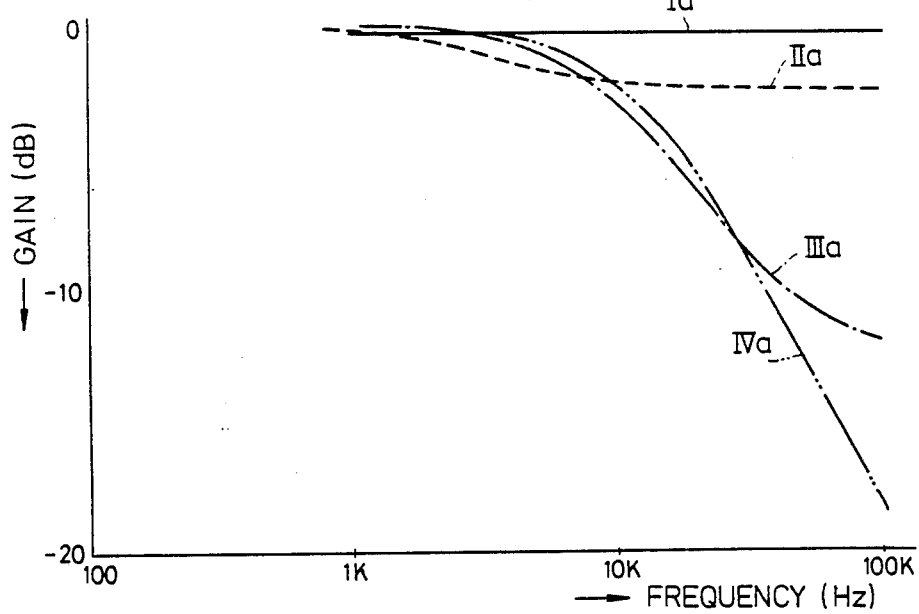

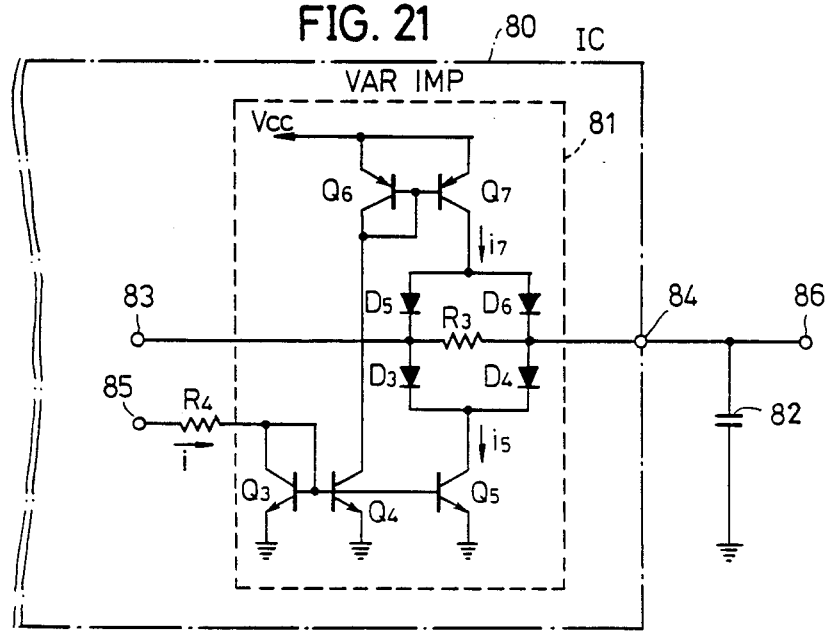
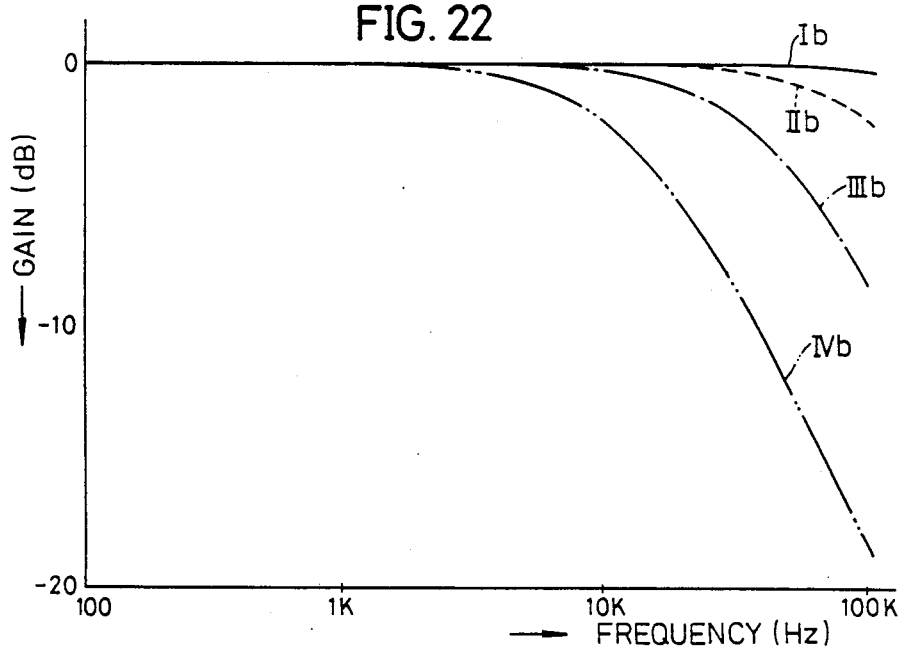

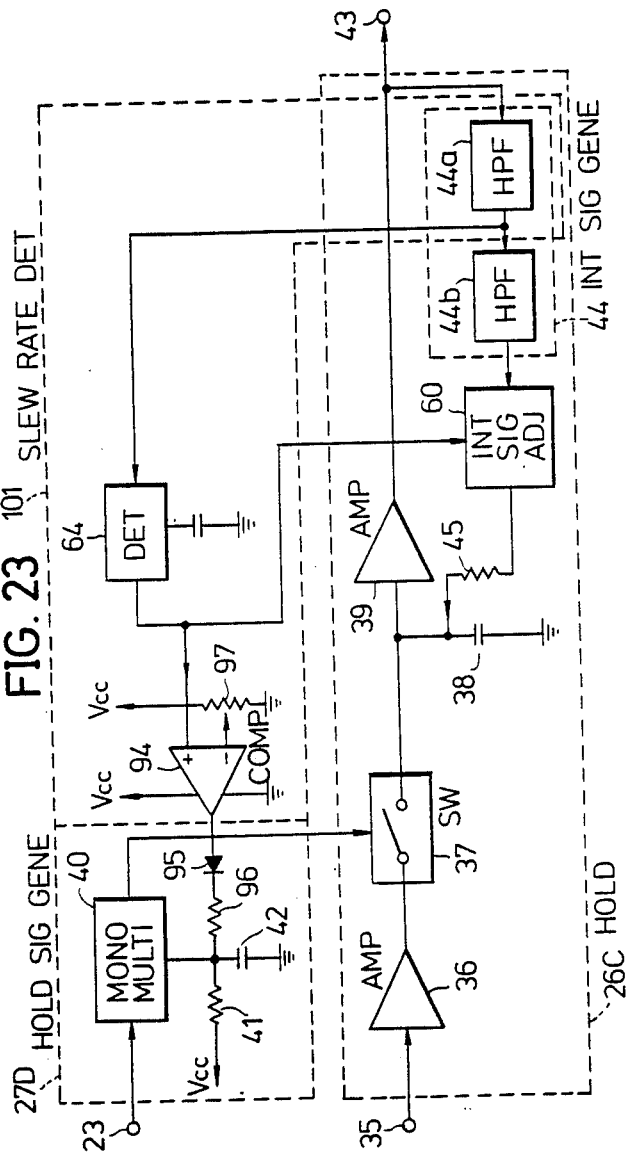

NOISE REDUCTION CIRCUIT FOR REDUCING PULSE NOISE IN AUDIO SIGNAL REPRODUCED FROM A RECORDING MEDIUM

BACKGROUND OF THE INVENTION

The present invention generally relates to noise reduction circuits, and more particularly to a noise reduction circuit which reduces pulse noise in reproduced audio signals by holding previous values or predicted value thereof in a helical scan type magnetic recording and reproducing apparatus which uses rotary heads to record and reproduce on and from a magnetic tape frequency modulated audio signals which are obtained by frequency-modulating carriers by audio signals.

Conventionally, in order to record and reproduce an audio signal in a helical scan type magnetic recording and reproducing apparatus (hereinafter referred to as a VTR) with a high quality, it is known to record and reproduce on and from a magnetic tape a frequency modulated audio signal (hereinafter simply referred to as an FM audio signal) which is obtained by frequency-modulating a carrier by the audio signal. The audio signal which is to be recorded is encoded in a first noise reducing part so that noise can be reduced at the time of a reproduction. A high frequency component of the encoded audio signal is emphasized in a pre-emphasis circuit so that high frequency noise can be reduced, and the audio signal from the pre-emphasis circuit is supplied to a frequency modulator. An output FM audio signal of the frequency modulator is amplified and is recorded on oblique tracks of the magnetic tape by a pair of rotary heads which alternately form the oblique tracks. At the time of the reproduction, reproduced FM audio signals from the rotary heads are alternately supplied to a switching circuit. The switching circuit switches over so as to selectively pass the output of the rotary head which is scanning the oblique track of the magnetic tape, and thus, a continuous reproduced FM audio signal is obtained from the switching circuit. The reproduced FM audio signal from the switching circuit is supplied to a frequency modulator and an envelope detection circuit. A reproduced audio signal obtained from the frequency demodulator is supplied to a hold circuit wherein the signal is held during a time period in which a hold signal is supplied to the hold circuit from an adding circuit which adds outputs of first and second hold signal generating circuits.

The reproduced audio signal from the frequency demodulator includes large noise when (a) the reproduced FM audio signals from the rotary heads are switched in the switching circuit, (b) when an envelope level of the reproduced FM audio signal decreases due to a signal dropout caused by scratches, dust particles and the like on the magnetic tape, (c) when the envelope level of the reproduced FM audio signal decreases due to tracking error and the like of the rotary heads, and (d) when playing a magnetic tape which is not recorded with an FM audio signal. In the case (a), pulse noise is generated in the reproduced audio signal because a continuity in a waveform of the reproduced FM audio signal is distorted when the reproduced FM audio signals are switched in the switching circuit due to causes such as a difference in tensions of the magnetic tape at the time of the recording and at the time of the reproduction. In the cases (b), (c) and (d), noise is generated essentially due to the absence of the FM audio signal, and in these cases, the noise is generated for long time periods compared to a time period in which the pulse noise is generated. Generally, the time period in which the noise is generated in the case (c) is longer than the time period in which the noise is generated in the case (b) and is shorter than the time period in which the noise is generated in the case (d).

The noise described above is reduced in the hold circuit and a muting circuit. An output signal of the hold circuit is supplied to a de-emphasis circuit wherein the high frequency component of the signal emphasized at the time of the recording is attenuated. An output signal of the de-emphasis circuit is given a level expanding characteristic complementary to that at the time of the recording in a second noise reducing part and is thereafter supplied to the muting circuit. A muting signal generating circuit generates a muting signal which has a high level when an output detection signal of the envelope detection circuit is smaller than a predetermined level for over a certain time period and holds the high level until a specific time period elapses from a time when the output detection signal becomes larger than the predetermined level. The muting circuit performs a muting operation only during a high level period of the muting signal. When the reproduced FM audio signals from the rotary heads are switched in the switching circuit, the envelope level of the output reproduced FM audio signal is larger than the predetermined level, and the level of the muting signal remains at the low level. For this reason, the muting circuit does not perform the muting operation, and an output reproduced audio signal waveform of the mtuing circuit is the same as that of the hold circuit.

On the other hand, when the noise is generated for a relatively long time period due to the signal dropout or the decrease in the envelope level of the reproduced FM audio signal, a hold signal which has a low level only during a time period in which the hold signal is generated based on the output detection signal of the envelope detection circuit is supplied from the second hold signal generating circuit to the hold circuit via the adding circuit. Accordingly, during the time period in which the noise is generated, the reproduced audio signal which is held at the signal level immediately before the noise is generated is passed through the de-emphasis circuit and the second noise reducing part, and is supplied to the muting circuit wherein the signal is muted during a hold time period and a certain time period immediately thereafter.

In the VTR having the construction described heretofore, a noise reduction circuit for reducing pulse noise in the reproduced audio signal is constituted by the hold circuit, the first hold signal generating circuit and the adding circuit described above. In one example of the conventional noise reduction circuit, the pulse noise can be eliminated by the hold operation of the hold circuit as will be described later on in the specification in conjunction with the drawings, however, there is a problem in that an error corresponding to a change in the signal during the hold time period remains in the reproduced audio signal. This error becomes large as a slew rate of the reproduced audio signal becomes high.

In another example of the conventional noise reduction circuit, an interpolation signal generating circuit is provided within the hold circuit as will be described later in conjunction with the drawings. According to this conventional noise reduction circuit, the error which remains in the reproduced audio signal during the hold time period is extremely small when the slew rate of the reproduced audio signal is low. Furthermore, even when the slew rate of the reproduced audio signal is high, the error which remains in the reproduced audio signal is small compared to that of the conventional noise reduction circuit described before. However, when the slew rate of the reproduced audio signal is high, there is a problem in that it is impossible to make the error which remains in the reproduced audio signal extremely small. On the other hand, normally, in addition to the pulse noise, the reproduced audio signal in most cases includes a high frequency noise component which constantly has a low level. Because the high frequency noise component is included in the reproduced audio signal, a slope which is predicted in the interpolation signal generating circuit becomes inconsistent. When the slew rate of the reproduced audio signal is high, the error which remains in the reproduced audio signal is small compared to the conventional noise reduction circuit described before which performs the simple hold operation, even when the inconsistency is introduced in the slope prediction. However, when the slew rate of the reproduced audio signal is low and the inconsistency is introduced in the slope prediction, there is a problem in that the error which remains in the reproduced audio signal becomes larger than that of the conventional noise reduction circuit described before which performs the simple hold operation.

SUMMARY OF THE INVENTION

Accordingly, it is a general object of the present invention to provide a novel and useful noise reduction circuit in which the problems described heretofore are eliminated.

Another and more specific object of the present invention is to provide a noise reduction circuit which is provided with a slew rate detection circuit for detecting a slew rate of a reproduced audio signal and is designed to variably control a pulse width of a hold signal depending on the detected slew rate. According to the noise reduction circuit of the present invention, an error which corresponds to a change in the signal during a hold time period and occurs when pulse noise in the reproduced audio signal is eliminated can be made small.

Still another object of the present invention is to provide a noise reduction circuit which comprises an interpolation signal adjusting circuit for adjusting an output interpolation signal of an interpolation signal generating circuit provided within a hold circuit depending on a slew rate of a reproduced audio signal. According to the noise reduction circuit of the present invention, it is possible to make an inconsistency in a slope prediction caused by a high frequency noise component included in the reproduced audio signal small depending on the slew rate. Hence, even when the reproduced audio signal includes the high frequency noise component and the slew rate is low, it is possible to satisfactorily eliminate pulse noise in the reproduced audio signal by making the inconsistency in the slope prediction small.

A further object of the present invention is to provide a noise reduction circuit in which the interpolation signal adjusting circuit described above is constituted by a variable lowpass filter comprising a variable impedance circuit and a capacitor. According to the noise reduction circuit of the present invention, it is possible to perform optimum adjustment of the interpolation signal from mid to high frequencies depending on the slew rate. Thus, even when the slew rate is small, it is possible to satisfactorily eliminate the pulse noise in the reproduced audio signal by making the inconsistency in the slope prediction small.

Other objects and further features of the present invention will be apparent from the following detailed description when read in conjunction with the accompanying drawings.

BRIEF DESCRIPTION OF THE DRAWINGS

FIG. 8 is a system circuit diagram showing a first embodiment of the noise reduction circuit according to the present invention;

FIGS. 9)A) through 9(F) and FIGS. 10(A) through 10(F) respectively show signal waveforms for explaining the operation of the circuit system shown in FIG. 8;

FIG. 11 is a system circuit diagram showing a second embodiment of the noise reduction circuit according to the present invention;

FIGS. 12(A) through 12(F) and FIGS. 13(A) through 13(F) respectively show signal waveforms for explaining the operation of the circuit system shown in FIG. 11;

FIGS. 14(A) through 14(D) and FIGS. 15(A) through 15(D) respectively show signal waveforms for explaining the operation of the circuit system shown in FIG. 5 when a high frequency noise component is included in a reproduced audio signal;

FIG. 16 is a system circuit diagram showing a third embodiment of the noise reduction circuit according to the present invention;

FIGS. 17(A) through 17(H) and FIGS. 18(A) through 18(H) respectively show signal waveforms for explaining the operation of the circuit system shown in FIG. 16;

FIGS. 19A and 19B are circuit diagrams respectively showing an embodiment of a part of the circuit system shown in FIG. 16;

FIG. 20 is a graph showing a characteristic of the circuit shown in FIG. 19B;

FIG. 21 is a circuit diagram showing another embodiment of a part of the circuit system shown in FIG. 16;

FIG. 22 is a graph showing a characteristic of the circuit shown in FIG. 21;

FIG. 23 is a system circuit diagram showing a fourth embodiment of the noise reduction circuit according to the present invention; and FIG. 24 is a system circuit diagram showing an embodiment of a part of the circuit systems in the second through fourth embodiments.

DETAILED DESCRIPTION

Figure 1:
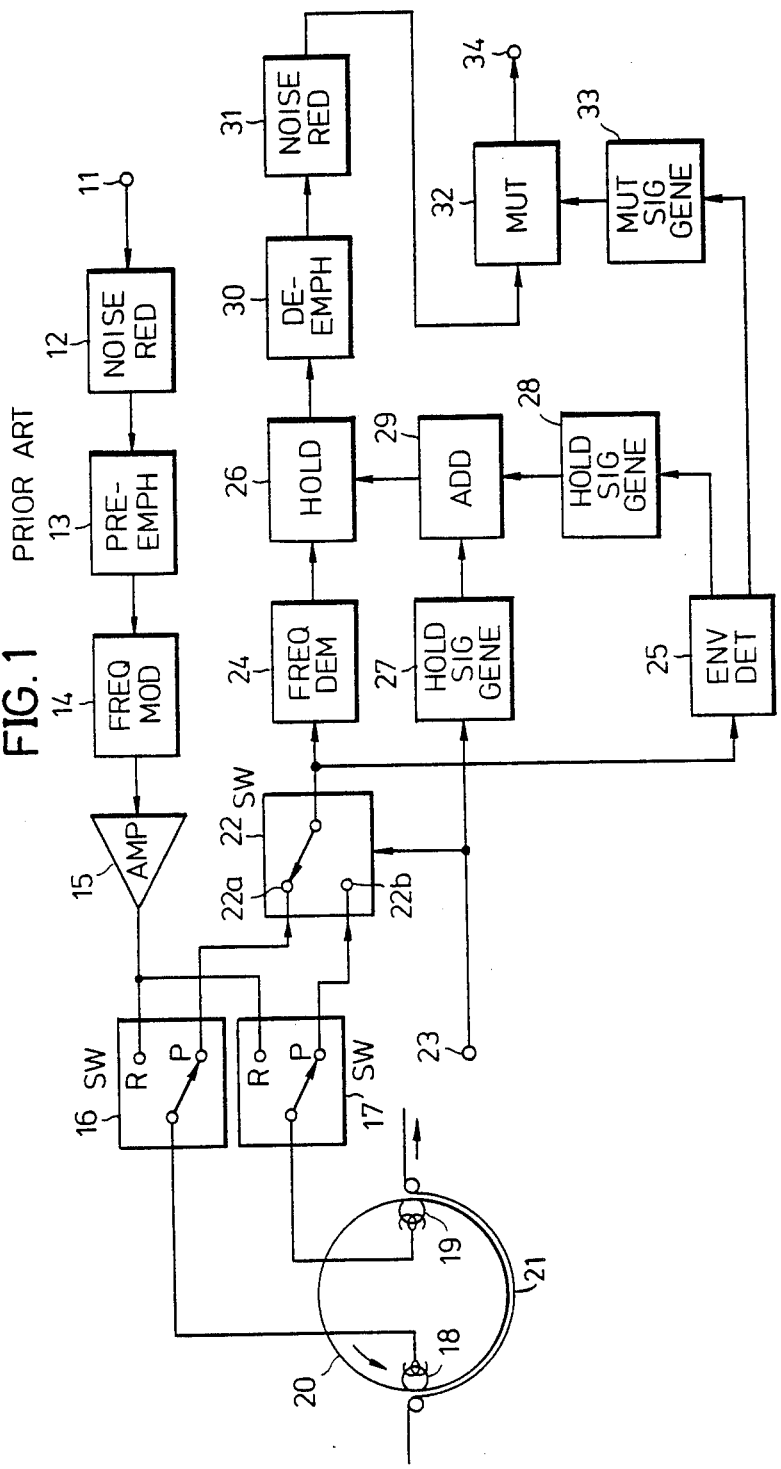
FIG. 1 is a system block diagram showing an example of an audio signal recording and reproducing system of a VTR to which the noise reduction circuit of the present invention may be applied.

FIG. 1 shows an example of an audio signal recording and reproducing system of the VTR to which the noise reduction circuit according to the present invention may be applied. In FIG. 1, only a recording and reproducing system for one channel of the audio signal is shown for convenience' sake. However, the VTR may be designed to record and reproduce stereo audio signals, and in such a case, FM audio signals are recorded and reproduced in two recording and reproducing systems for the two channels. In FIG. 1, an audio signal which is to be recorded is applied to an input terminal 11 and is encoded in a noise reducing part 12 so that noise can be reduced at the time of a reproduction. An output audio signal of the noise reducing part 12 is passed through a pre-emphasis circuit 13 wherein a high frequency component of the audio signal is emphasized for the purpose of reducing high frequency noise, and is supplied to a frequency modulator 14 wherein the audio signal is frequency-modulated. An output FM audio signal of the frequency modulator 14 is supplied to a recording amplifier 15 and is amplified. An output FM audio signal of the recording amplifier 15 is passed through switching circuits 16 and 17 which are connected to respective terminals R at the time of the recording, and is supplied to rotary heads 18 and 19.

The rotary heads 18 and 19 are mounted at diametrical positions on a rotary drum 20. The rotary heads 18 and 19 record the FM audio signal on a magnetic tape 21 which is wrapped obliquely around an outer peripheral surface of the rotary drum 20 for an angular range which is slightly greater than 180° and moves in a direction of an arrow, by forming tracks which are oblique to a longitudinal direction of the magnetic tape 21. In the case where the rotary heads 18 and 19 are provided exclusively for recording the audio signal, two rotary heads (not shown) exclusively for recording a video signal must be mounted on the rotary drum 20. The two rotary heads exclusively for recording the video signal may be designed to record the video signal over the FM audio signal which is recorded on a deep portion of a magnetic layer of the magnetic tape 21, as is well known. On the other hand, in the case where the rotary heads 18 and 19 are designed to record and reproduce both the audio and video signals, the rotary heads 18 and 19 are supplied in addition to the FM audio signal a video signal having a frequency band which differs from that of the FM audio signal, and the FM audio signal and the video signal are simultaneously recorded on the same tracks, as is well known.

Next, description will be given with respect to the operation of the system shown in FIG. 1 at the time of the reproduction. The FM audio signals reproduced from the magnetic tape 21 by the rotary heads 18 and 19 are passed through the respective switching circuits 16 and 17 which are connected to terminals P at the time of the reproduction, and are supplied to terminals 22a and 22b of a switching circuit 22. A drum pulse signal in accordance with a rotation of the rotary drum 20 is applied to an input terminal 23, and the switching circuit 22 is switched responsive to the drum pulse signal so as to selectively pass the output signal of the rotary head which is presently scanning the magnetic tape 21. As a result, a continuous reproduced FM audio signal is obtained from the switching circuit 22 and is supplied to a frequency demodulator 24 and an envelope detection circuit 25. An output reproduced audio signal of the frequency demodulator 24 is supplied to a hold circuit 26 wherein the signal is held during a time period in which a hold signal is supplied to the hold circuit 26 from an adding circuit 29 which adds output signals of hold signal generating circuits 27 and 28.

The output reproduced audio signal of the frequency demodulator 24 includes large noise when (a) the reproduced FM audio signals from the rotary heads 18 and 19 are switched in the switching circuit 22, (b) when an envelope level of the reproduced FM audio signal decreases due to a signal dropout caused by scratches, dust particles and the like on the magnetic tape 21, (c) when the envelope level of the reproduced FM audio signal decreases due to tracking error and the like of the rotary heads 18 and 19, and (d) when playing a magnetic tape which is not recorded with an FM audio signal. In the case (a), pulse noise is generated in the reproduced audio signal because a continuity in a waveform of the reproduced FM audio signal is distorted when the reproduced FM audio signals are switched in the switching circuit 22 due to causes such as a difference in tensions of the magnetic tape 21 at the time of the recording and at the time of the reproduction. In the cases (b), (c) and (d), noise is generated essentially due to the absence of the FM audio signal, and in these cases, the noise is generated for long time periods compared to a time period in which the pulse noise is generated. Generally, the time period in which the noise is generated in the case (c) is longer than the time period in which the noise is generated in the case (b) and is shorter than the time period in which the noise is generated in the case (d).

The noise described above is reduced in the hold circuit 26 and a muting circuit 32 shown in FIG. 1. An output signal of the hold circuit 26 is supplied to a de-emphasis circuit 30 wherein the high frequency component of the signal emphasized at the time of the recording is attenuated. An output signal of the de-emphasis circuit 30 is given a level expanding characteristic complementary to that at the time of the recording in a noise reducing part 31 and is thereafter supplied to the muting circuit 32. A muting signal generating circuit 33 generates a muting signal which has a high level when an output detection signal of the envelope detection circuit 25 is smaller than a predetermined level for over a certain time period and holds the high level until a specific time period elapses from a time when the output detection signal becomes larger than the predetermined level. The muting circuit 32 performs a muting operation only during a high level period of the muting signal supplied thereto. When the reproduced FM audio signals from the rotary heads 18 and 19 are switched in the switching circuit 22, the envelope level of the output reproduced FM audio signal is larger than the predetermined level, and the level of the muting signal remains at the low level. For this reason, the muting circuit 32 does not perform the muting operation, and an output reproduced audio signal waveform of the muting circuit 32 supplied to an output terminal 34 is the same as that of the hold circuit 26.

On the other hand, when the noise is generated for a relatively long time period due to the signal dropout or the decrease in the envelope level of the reproduced FM audio signal, a hold signal which has a low level only during a time period in which the hold signal is generated based on the output detection signal of the envelope detection circuit 25 is supplied from the hold signal generating circuit 28 to the hold circuit 26 via the adding circuit 29. Accordingly, during the time period in which the noise is generated, the reproduced audio signal which is held at the signal level immediately before the noise is generated is passed through the de-emphasis circuit 30 and the noise reducing part 31, and is supplied to the muting circuit 32 wherein the signal is muted during a hold time period and a certain time period immediately thereafter.

In the VRT having the construction described heretofore, a noise reduction circuit for reducing pulse noise in the reproduced audio signal is constituted by the hold circuit 26, the hold signal generating circuit 27 and the adding circuit 29 described above.

Figure 2:
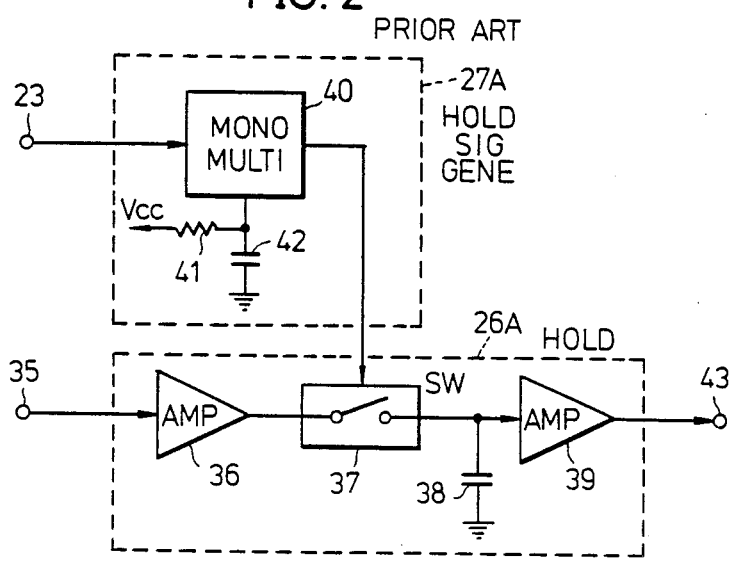
FIG. 2 is a system circuit diagram showing an example of the conventional noise reduction circuit.

One example of the conventional noise reduction circuit is shown in FIG. 2. In the description given hereunder, the illustration and description of the adding circuit 29 will be omitted for convenience' sake. In FIG. 2, those parts which are the same as those corresponding parts in FIG. 1 are designated by the same reference numerals, and description thereof will be omitted. The reproduced audio signal applied to an input terminal 35 is passed through a buffer amplifier 36 within a hold circuit 26A and is supplied to a switching circuit 37. On the other hand, the drum pulse signal shown in FIGS. 3(A) and 4(A) from the input terminal 23 is supplied to a monostable multivibrator 40 within a hold signal generating circuit 27A. The monostable multivibrator 40 is triggered by rises and falls in the drum pulse signal, that is, triggered with the switching timing of the switching circuit 22. The monostable multivibrator 40 generates a hold signal shown in FIGS. 3(B) and 4(B) which has a low level for a predetermined time period T1 from the time when the monostable multivibrator 40 is triggered, where the predetermined time period T1 is determined by a product of a resistance R1 of a resistor 41 and a capacitance C1 of a capacitor 42 which are coupled to the monostable multivibrator 40. The output hold signal of the monostable multivibrator 40 is supplied to the switching circuit 37 as a switching signal, and the switching circuit 37 is turned OFF during the low level period T1 of the hold signal.

Figure 3:
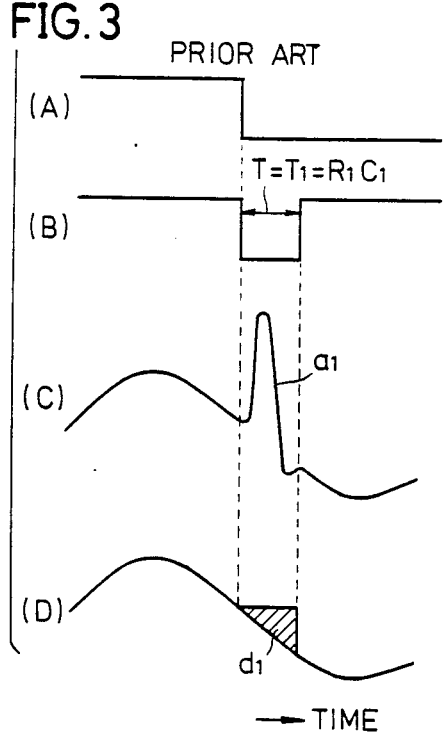
FIGS. 3(A) through 3(D) and FIGS. 4(A) through 4(D) respectively show signal waveforms for explaining the operation of the circuit system shown in FIG. 2.
Figure 4:
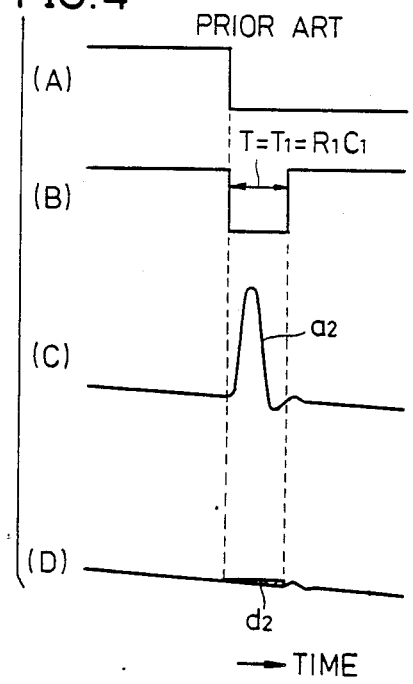

During time periods other than the time period T1, the switching circuit 37 is turned ON and the reproduced audio signal from the buffer amplifier 37 is supplied to a hold capacitor 38 via the switching circuit 37. On the other hand, during the time period T1, the switching circuit 37 is turned OFF and a level of the reproduced audio signal immediately before the time period T1 is held in the hold capacitor 38. A terminal voltage of the hold capacitor 38 is passed through a buffer amplifier 39 and is supplied to an output terminal 43 as a reproduced audio signal. Hence, an output signal of the hold circuit 26A supplied to the output terminal 43 has a waveform shown in FIG. 3(D) when the reproduced audio signal applied to the input terminal 35 has pulse noise a1 and the slew rate is high as shown in FIG. 3(C), and has a waveform shown in FIG. 4(D) when the reproduced audio signal applied to the input terminal 35 has pulse noise a2 and the slew rate is low as shown in FIG. 4(C).

As a result, the pulse noise a1 and a2 are both eliminated by the hold operation described above, but a small triangular error corresponding to a change in the signal in the hold time period T1 remains in the output reproduced audio signal of the hold circuit 26A. The triangular error is indicated by d1 with hatchings in FIG. 3(D) and by d2 with hatchings in FIG. 4(D). As may be seen from FIGS. 3(D) and 4(D), the triangular error is large when the slew rate of the reproduced audio signal applied to the input terminal 35 is high. Although the triangular error is introduced, the conventional noise reduction circuit shown in FIG. 2 is effective to a certain extent in that the pulse noise is eliminated.

Figure 5:
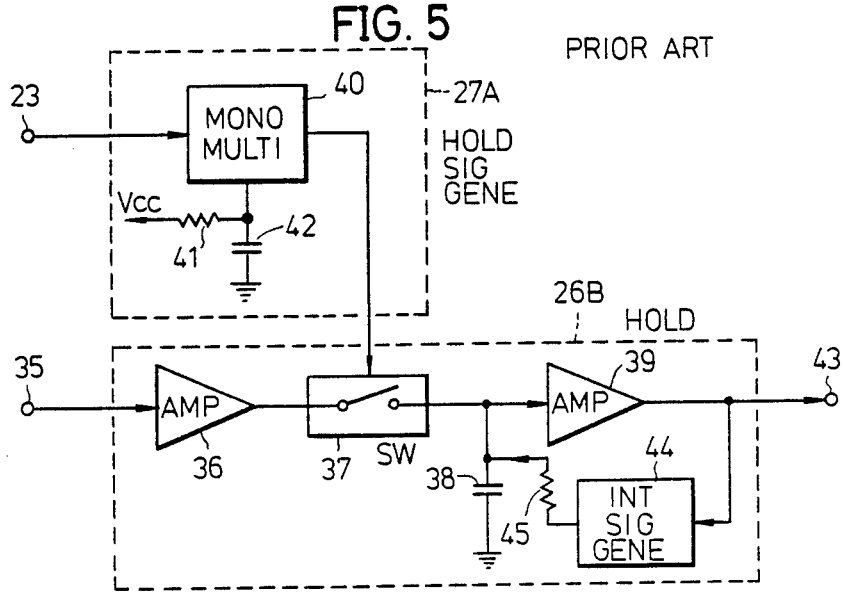
FIG. 5 is a system circuit diagram showing another example of the conventional noise reduction circuit.

FIG. 5 shows another example of the conventional noise reduction circuit comprising a signal interpolation circuit. In FIG. 5 those parts which are the same as those corresponding parts in FIG. 2 are designated by the same reference numerals, and description thereof will be omitted. In FIG. 5, the output reproduced audio signal of the buffer amplifier 39 within a hold circuit 26B is supplied to the output terminal 43 and an interpolation signal generating circuit 44. A signal interpolation circuit previously proposed in a Japanese Patent Application No. 58-133128 or an interpolation signal generating circuit within a signal interpolation circuit previously proposed in a Japanese Patent Application No. 58-155668 may be used for the interpolation signal generating circuit 44. In the two Japanese Patent Applications referred to above, the applicant is the same as the assignee of the present application.

According to the latter previously proposed signal interpolation circuit, a time constant of a first order differentiating circuit within a slope prediction circuit is set so that the frequency becomes low and the gain becomes approximately constant, and the gain is set so that an output voltage of the slope prediction circuit has a low frequency and becomes approximately equal to a terminal voltage of a hold capacitor. The output voltage of the slope prediction circuit is subjected to a voltage-to-current conversion in a voltage-to-current converting circuit which supplies to the hold capacitor a current for performing an ideal interpolation. The voltage-to-current converting circuit is constituted solely of a simple impedance element such as a resistor.

On the other hand, according to the former previously proposed signal interpolation circuit, a loop is constituted by supplying an output signal voltage of a hold circuit to a hold capacitor via a slope prediction circuit and a voltage-to-current converting circuit. The signal can be interpolated based on the slope predicted in the slope prediction circuit.

Figure 6:
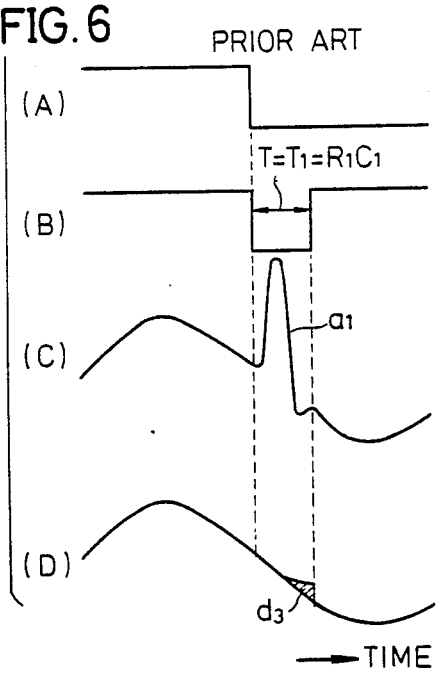
FIGS. 6(A) through 6(D) and FIGS. 7(A) through 7(D) respectively show signal waveforms for explaining the operation of the circuit system shown in FIG. 5.
Figure 7:
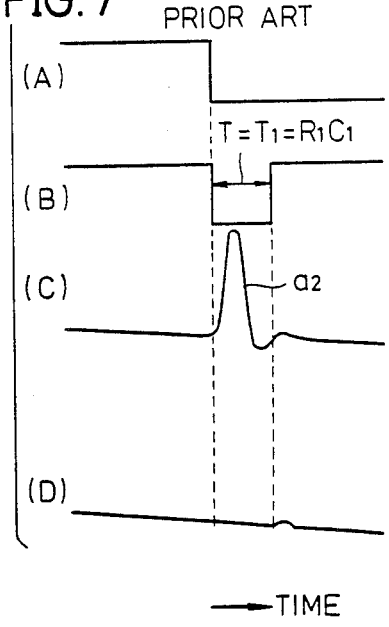

By using these previously proposed signal interpolation circuits as the interpolation signal generating circuit 44, it is possible to satisfactorily eliminate the pulse noise in the reproduced audio signal. When the reproduced audio signal including the pulse noise a1 shown in FIG. 6(C) or the pulse noise a2 shown in FIG. 7(C) is applied to the input terminal 35, a signal which is obtained by predicting the next signal from the signal immediately before the pulse noise a1 or a2 is supplied to the hold capacitor 38 via a resistor 45. The hold capacitor 38 is charged and discharged based on the predicted signal. As a result, the pulse noise a1 or a2 is suppressed and a reproduced audio signal in which the triangular error is extremely small compared to that of the conventional circuit shown in FIG. 2 is produced from the buffer amplifier 39 and is supplied to the output terminal 43 as shown in FIGS. 6(D) or 7(D). FIGS. 6(A) and 7(A) respectively show the drum pulse signal, and FIGS. 6(B) and 7(B) respectively show the output hold signal of the hold signal generating circuit 40.

According to the conventional noise reduction circuit shown in FIG. 5, the triangular error remaining in the reproduced audio signal shown in FIG. 7(D) is extremely small when the slew rate is low as shown in FIG. 7(C). However, when the slew rate is high as shown in FIG. 6(C), the triangular error remaining in the reproduced audio signal is small compared to that of the conventional noise reduction circuit shown in FIG. 2 but there still remains some triangular error which cannot be neglected as indicated by d3 in FIG. 6(D).

Therefore, the present invention provides a noise reduction circuit in which a pulse width of a hold signal is variably controlled depending on the slew rate of the input reproduced audio signal, so that the triangular error can be further reduced even when the slew rate of the input reproduced audio signal is high, that is, even when the input reproduced audio signal has a high frequency and a high level.

FIG. 8 shows a first embodiment of the noise reduction circuit according to the present invention. In FIG. 8, those parts which are the same as those corresponding parts in FIG. 2 are designated by the same reference numerals, and description thereof will be omitted. The output reproduced audio signal of the buffer amplifier 39, that is, the hold circuit 26A, is supplied to a highpass filter 48 within a slew rate detection circuit 47. The slew rate detection circuit 47 comprises the highpass filter 48, an amplifier 49 and a detection circuit 50 which are coupled in series. The highpass filter 48 has a cutoff frequency which is approximately an upper limit frequency (for example, 20 kHz) of the audio-frequency band. The highpass filter 48 filters a high frequency component of the reproduced audio signal from the hold circuit 26A and supplies a filtered output signal thereof to the detection circuit 50 via the amplifier 49.

The detection circuit 50 detects the envelope of the output signal of the amplifier 49 with such a time constant that an attack time is in a range of 3 msec and a recovery time is in a range of 30 msec, for example. The detection circuit 50 generates a D.C. voltage (detection signal) having a level depending on a peak-to-peak value of the output signal of the amplifier 49, and this D.C. voltage is supplied to a variable resistor element 51 within a hold signal generating circuit 27B as a control voltage therefor. Hence, when the reproduced audio signal applied to the input terminal 35 has the pulse noise a1 and the slew rate is high as shown in FIG. 9(E), the output signal of the highpass filter 48 has a high peak-to-peak value as shown in FIG. 9(B), and the output detection signal of the detection circuit 50 consequently has a high voltage Va as shown in FIG. 9(C). On the other hand, when the reproduced audio signal applied to the input terminal 35 has the pulse noise a2 and the slew rate is low as shown in FIG. 10(E), the output signal of the highpass filter 48 has a low peak-to-peak value as shown in FIG. 10(B), and the output detection signal of the detection circuit 50 consequently has a low voltage Vb as shown in FIG. 10(C).

The hold signal generating circuit 27B shown in FIG. 8 has some similarities with the conventional hold signal generating circuit 27A shown in FIG. 2 in that a terminal 40a of the monostable multivibrator 40 is coupled to a power source of a voltage Vcc via the resistor 41 on one hand and is grounded via the capacitor 42 on the other. The hold signal generating circuit 27B differs from the hold signal generating circuit 27A in that, in the hold signal generating circuit 27B, a series circuit comprising the variable resistor element 51 and a resistor 52 is coupled to the terminal 40a. In other words, one terminal of the resistor 52 is coupled to a connection point of the resistor 41 and the capacitor 42, and one terminal of the variable resistor element 51 not coupled to the resistor 52 is coupled to the power source of the voltage Vcc. A time constant of the monostable multivibrator 40 can be described by $[R1//(R2+R3)] \cdot C1$, where R1 denotes the resistance of the resistor 41, R2 denotes the resistance of the resistor 52, R3 denotes the resistance of the variable resistor element 51 and C1 denotes the capacitance of the capacitor 42. The monostable multivibrator 40 is triggered by the drum pulse signal shown in FIGS. 9(A) and 10(A) which is applied to the input terminal 23, and generates a hold signal having a low level pulse width during a time period of the time constant from a time when the monostable multivibrator 40 is triggered.

When it is assumed that the variable resistor element 51 is designed to produce a low resistance when the output detection signal of the detection circuit 50 is high and to produce a high resistance when the output detection signal of the detection circuit 50 is low, the variable resistor element 51 produces a resistance $R3_{(Va)}$ when the detection signal has the level Va and produces a resistance $R3_{(Vb)}$ when the detection signal has a level Vb, where $R3_{(Va)}$ is smaller than $R3_{(Vb)}$.

For this reason, the output hold signal of the monostable multivibrator 40 has a pulse width Ta described by the following equation (1) when the slew rate of the reproduced audio signal is high as shown in FIG. 9(E).

$$Ta = [R1//(R2+R3_{(Va)})] \cdot C1 \quad (1)$$

On the other hand, the output hold signal of the monostable multivibrator 40 has a pulse width Tb described by the following equation (2) when the slew rate of the reproduced audio signal is low as shown in FIG. 10(E).

$$Tb = [R2//(R2+R3_{(Vb)})] \cdot C1 \quad (2)$$

Hence, the pulse width Ta is smaller than the pulse width Tb. FIG. 9(D) shows the signal waveform of the hold signal having the pulse width Ta, and FIG. 10(D) shows the signal waveform of the hold signal having the pulse width Tb. A pulse width T (Ta or Tb) of the hold signal indicates the hold time period of the hold capacitor 38, and when the resistance R3 of the variable resistor element 51 is infinity, a maximum pulse width Tmax of the hold signal can be described by the following equation (3).

$$Tmax = R1 \cdot C1 \quad (3)$$

On the other hand, when the resistance R3 of the variable resistor element 51 is zero, a minimum pulse width Tmin of the hold signal can be described by the following equation (4).

$$Tmin = (R1//R2) \cdot C1 \quad (4)$$

Therefore, the pulse width T of the hold signal should be selected in a range of $Tmax \geq T \geq Tmin$.

The pulse width Tmax is set to a time width for virtually eliminating the pulse noise in the reproduced audio signal by the holding operation, and is equal to $12\mu$ sec, for example. The pulse width Tmin is set to such a time width that most of the energy of the pulse noise in the reproduced audio signal is eliminated but a linking portion immediately after the pulse noise is not held, and is equal to $6\mu$ sec, for example.

Accordingly, when the reproduced audio signal including the pulse noise a1 shown in FIG. 9(E) is applied to the input terminal 35 shown in FIG. 8, the reproduced audio signal is passed through the low impedance switching circuit 37 until the pulse noise a1 arrives. Hence, the reproduced audio signal from the switching circuit 37 is amplified in the buffer amplifier 39 and is supplied to the output terminal 43. The reproduced audio signal from the output terminal 43 is passed through the de-emphasis circuit 30, the noise reducing part 31 and the muting circuit 32 shown in FIG. 1, and is supplied to the output terminal 34 shown in FIG. 1. The hold capacitor 38 coupled between the output terminal of the switching circuit 37 and the input terminal of the buffer amplifier 39 does not act as a large load, and the reproduced audio signal is passed essentially as it is.

However, when the pulse noise a1 arrives, the low level hold signal shown in FIG. 9(D) is supplied to the switching circuit 37 from the monostable multivibrator 40 for the time period Ta which includes the time period in which the pulse noise a1 is generated. Hence, the switching circuit 37 is turned OFF during the time period Ta. As a result, a current is no longer applied to the hold capacitor 38 from the switching circuit 37. Furthermore, since an input impedance of the buffer amplifier 39 is set to a sufficiently large value, the terminal voltage of the hold capacitor 39 is held for the low level period Ta of the hold signal at the voltage which is obtained at the point in time when the hold signal shown in FIG. 9(D) falls to the low level from the high level.

Accordingly, in the case of the reproduced audio signal shown in FIG. 9.(E) having the high slew rate, the hold operation is performed responsive to the hold signal having the narrow pulse width Ta shown in FIG. 9(D), and the reproduced audio signal shown in FIG. 9(F) is obtained via the output terminal 43. The pulse noise a1 is eliminated and a triangular error f1 is small in the reproduced audio signal obtained via the output terminal 43, and the triangular error f1 remaining in the reproduced audio signal is small compared to that in the case of the conventional noise reduction circuit shown in FIG. 2. On the other hand, in the case of the reproduced audio signal sown in FIG. 10(E) having the low slew rate, the hold operation is performed responsive to the hold signal having the relatively wide pulse width Tb shown in FIG. 10(D), and the reproduced audio signal shown in FIG. 10(F) is obtained via the output terminal 43. The pulse noise a2 and a triangular error f2 is small in the reproduced audio signal obtained via the output terminal 43, and the triangular error f2 remaining in the reproduced audio signal is small compared to that in the case of the conventional noise reduction circuit shown in FIG. 2.

Next, description will be given with respect to a second embodiment of the noise reduction circuit according to the present invention. FIG. 11 shows the second embodiment of the noise reduction circuit. The present embodiment is a modification of the conventional noise reduction circuit shown in FIG. 5, and in FIG. 11, those parts which are the same as those corresponding parts in FIG. 5 are designated by the same reference numerals, and description thereof will be omitted. In FIG. 11, the interpolation signal generating circuit 44 comprises a differentiating circuit as described before, and in principle generates an interpolation signal in which a high frequency component is emphasized. In other words, when the reproduced audio signal shown in FIG. 12(E) having the high slew rate is applied to the input terminal 35, the interpolation signal generated by the interpolation signal generating circuit 44 has a waveform indicated by a solid line in FIG. 12(B). The waveform shown in FIG. 12(E) is identical to those shown in FIGS. 9(E), 3(C) and 6(C). On the other hand, when the reproduced audio signal shown in FIG. 13(E) having the low slew rate is applied to the input terminal 35, the interpolation signal generated by the interpolation signal generating circuit 44 has a waveform indicated by a solid line in FIG. 13(B). The waveform shown in FIG. 13(E) is identical to those shown in FIGS. 10(E), 4(C) and 7(C).

The output interpolation signal of the interpolation signal generating circuit 44 is supplied to a detection circuit 55 within a slew rate detection circuit 54. The slew rate detection circuit 54 comprises the detection circuit 55, a comparator 56 and a variable resistor 57. The detection circuit 55 has a construction similar to that of the detection circuit 50 described before, and generates a detection signal having a level which changes depending on the detected slew rate of the reproduced audio signal. FIGS. 12(C) and 13(C) respectively show the detection signals which are obtained by the reproduced audio signals shown in FIGS. 12(E) and 13(E) are applied to the input terminal 35. The comparator 56 compares the level of the output detection signal of the detection circuit 55 and the level of a reference voltage which is obtained by dividing the power source voltage Vcc by the variable resistor 57. The comparator 56 generates a slew rate detection signal having high and low levels depending on the compared result.

In the case where the reproduced audio signal has the high slew rate as shown in FIG. 12(E), a detection signal shown in FIG. 12(C) having a relatively high voltage Vc is obtained from the detection circuit 55. In this case, the comparator 56 detects that the detection signal voltage Vc is higher than the reference level and generates a high level slew rate detection signal, for example. On the other hand, in the case where the reproduced audio signal has the low slew rate as shown in FIG. 13(E), a detection signal shown in FIG. 13(C) having a voltage Vd lower than the reference level is obtained from the detection circuit 55. In this case, the comparator 56 detects that the detection signal voltage Vd is lower than the reference level and generates a low level slew rate detection signal. The slew rate detection signal from the comparator 56 is supplied to a switching circuit 58 within a hold signal generating circuit 27C.

The hold signal generating circuit 27C comprises the monostable multivibrator 40, the resistor 41, the capacitor 42, the switching circuit 58 and a resistor 59. A common connection point of the terminal 40a, the resistor 41 and the capacitor 42 is coupled to one terminal of the resistor 59. The other terminal of the resistor 59 is coupled to one terminal of the switching circuit 58, and another terminal of the switching circuit 58 is coupled to the power source of the voltage Vcc. The time constant of the monostable multivibrator 40 is determined by the resistance R1 of the resistor 41, the capacitance C1 of the capacitor 42, a resistance R2 of the resistor 59 and the ON or OFF state of the swtiching circuit 58. When the switching circuit 58 is turned ON, a time constant Tc of the monostable multivibrator 40 can be described by the following equation (5).

$$Tc = (R1//R2) \cdot C1 \qquad (5)$$

On the other hand, when the switching circuit 58 is turned OFF, a time constant Td of the monostable multivibrator 40 can be described the following equation (6).

$$Td = R1 \cdot C1 \qquad (6)$$

The switching circuit 58 is designed so that it is turned ON when the slew rate detection signal from the comparator 56 has a high level and is turned OFF when the slew rate detection signal has a low level. Therefore, in the case where the reproduced audio signal has the high slew rate as shown in FIG. 12(E), the output hold signal of the monostable multivibrator 40 has a low level for the time period Tc from a time when the drum pulse signal shown in FIG. 12(A) falls, as shown in FIG. 12(D). On the other hand, in the case where the reproduced audio signal has the low slew rate as shown in FIG. 13(E), the output hold signal of the monostable multivibrator 40 has a low level for the time period Td from a time when the drum pulse signal shown in FIG. 13(A) falls, as shown in FIG. 13(D), where Td is smaller than Tc.

According to the present embodiment, compared to the case where the reproduced audio signal has the low slew rate, the pulse width of the hold signal becomes narrow when the reproduced audio signal has the high slew rate. The reproduced audio signal supplied to the output terminal 43 when the reproduced audio signal shown in FIG. 12(E) is applied to the input terminal 35 has a waveform shown in FIG. 12(F), and the reproduced audio signal supplied to the output terminal 43 has a waveform shown in FIG. 12(F) when the reproduced audio signal shown in FIG. 13(E) is applied to the input terminal 35. As may be seen from FIGS. 12(F) and 13(F), virtually no triangular error remains in the reproduced audio signal. According to the present embodiment, the triangular error d3 which remains in the reproduced audio signal shown in FIG. 6(D) when the reproduced audio signal having the high slew rate is supplied to the conventional noise reduction circuit shown in FIG. 5 is virtually not generated.

The present embodiment uses the interpolation signal in which the high frequency component is emphasized, and no highpass filter is required within the slew rate detection circuit 54. In addition, the hold signal generating circuit 27C does not have a variable resistor element but is designed to control the ON and OFF states of the swtiching circuit 58, and the operation of the hold signal generating circuit 27C is simple compared to that of the first embodiment described before.

According to the present embodiment, the monostable multivibrator 40 may only have two kinds of time constants, that is, Tc and Td, because the hold signal generating circuit 27C is designed to control the ON and OFF states of the switching circuit 58. However, compared to the conventional noise reduction circuit shown in FIG. 5, it is still possible to greatly reduce the triangular error in the reproduced audio signal. Furthermore, by variably adjusting the reference level of the comparator 56 with the variable resistor 57, it is possible to set the frequency and level at which the pulse width of the hold signal is changed. In other words, for the same level of the reproduced audio signal applied to the input terminal 35, the frequency at which the pulse width of the hold signal changes becomes higher as the reference level becomes higher. On the other hand, for the same frequency of the reproduced audio signal applied to the input terminal 35, the level at which the pulse width of the hold signal changes becomes higher as the reference level becomes higher.

Thus, the pulse width of the hold signal becomes narrower at the higher frequencies and at the higher levels, that is, at the higher slew rates.

In actual practice, the reference level may be fixed to an appropriate level, and the output detection signal of the detection circuit 55 may be supplied directly to the control terminal of the switching circuit 58.

In the description of the first and second embodiments, it is assumed that the input reproduced audio signal of the noise reduction circuit only includes the pulse noise. However, normally, in addition to the pulse noise, the input reproduced audio signal in most cases includes a high frequency noise component which constantly has a low level.

Because the high frequency noise component is included in the input reproduced audio signal, an inconsistency is introduced in the slope prediction performed in the interpolation signal generating circuit 44 shown in FIG. 5. In the case where the input reproduced audio signal has a high slew rate as shown in FIG. 14(C), the interpolation is performed with a slope within a range indicated by hatchings in FIG. 14(D). In this case, compared to a simple hold operation indicated by a one-dot chain line in FIG. 14(D), an interpolation error is small even when the inconsistency is introduced in the slope prediction. However, in the case where the input reproduced audio signal has a low slew rate as shown in FIG. 15(C), the interpolation is performed with a slope within a range indicated by hatchings In FIG. 15(D). In this case, there is a problem in that the interpolation error is larger than the error introduced by the simple hold operation when the inconsistency is introduced in the slope prediction. FIGS. 14(A) and 15(A) respectively correspond to FIGS. 6(A) and 7(A) described before, and FIGS. 14(B) and 15(B) respectively correspond to FIGS. 6(B) and 7(B) described before.

Accordingly, description will now be given with respect to embodiments in which the pulse noise in the input reproduced audio signal can be eliminated satisfactorily even when the input reproduced audio signal includes in addition to the pulse noise the high frequency noise component which constantly has a low level.

FIG. 16 is a system circuit diagram showing a third embodiment of the noise reduction circuit according to the present invention. In FIG. 16, those parts which are the same as those corresponding parts in FIG. 5 are designated by the same reference numerals, and description thereof will be omitted. The output interpolation signal of the interpolation signal generating circuit 44 within the hold circuit 26B is supplied to the resistor 45 via an interpolation signal adjusting circuit 60.

In addition, the output reproduced audio signal of the buffer amplifier 39 is supplied to a filter circuit 62 within a slew rate detection circuit 61. The slew rate detection circuit 61 comprises the filter circuit 62, an amplifier 63 and a detection circuit 64 which are coupled in series. The filter circuit 62 may be a highpass filter having a cutoff frequency selected to approximately an upper limit (for example, 20 kHz) of the audio-frequency band, or may be a bandpass filter having in addition to the characteristic of the above highpass filter a characteristic for reducing the gain for the frequencies exceeding the upper limit of the audio-frequency band. By using the bandpass filter for the filter circuit 62, it is possible to detect the slew rate of the reproduced audio signal alone, excluding the high frequency noise component.

The filter circuit 62 filters the high frequency component in the output reproduced audio signal of the buffer amplifier 39, that is, an output of a hold circuit 26C. An output signal of the filter circuit 62 is passed through the amplifier 63 and is supplied to the detection circuit 64. The detection signal generates a D.C. voltage (detection signal) having a level depending on a peak-to-peak value of the signal supplied thereto, and this D.C. voltage is supplied to the interpolation signal adjusting circuit 60. Accordingly, when the reproduced audio signal which has the pulse noise a1 and a high slew rate as shown in FIG. 17(A) is applied to the input terminal 35, the output signal of the filter circuit 62 has a high peak-to-peak value as shown in FIG. 17(D), and the output detection signal of the detection circuit 64 has high voltage Va as shown in FIG. 17(E). On the other hand, when the reproduced audio signal which has the pulse noise a2 and a low slew rate as shown in FIG. 18(A) is applied to the input terminal 35, the output signal of the filter circuit 62 has a low peak-to-peak value as shown in FIG. 18(D), and the output detection signal of the detection circuit 64 has a low voltage Vb as shown in FIG. 18(E).

The monostable multivibrator 40 within the hold signal generating circuit 27A is triggered by the rise in the drum pulse signal shown in FIGS. 17(B) and 18(B) and generates a hold signal shown in FIGS. 17(C) and 18(C) which has a low level for the predetermined time T1 from the time when the monostable multivibraor 40 is triggered. The interpolation signal generating circuit 44 has a circuit construction shown in FIG. 24 which will be described later. The interpolation signal generating circuit 44 generates an interpolation signal having a waveform shown in FIG. 17(F) with respect to the reproduced audio signal shown in FIG. 17(A), and generates an interpolation signal having a waveform shown in 18(F) with respect to the reproduced audio signal having a waveform shown in FIG. 18(A). The output interpolation signal of the interpolation signal generating circuit 44 is supplied to the interpolation signal adjusting circuit 60.

FIG. 19A shows an embodiment of the interpolation signal adjusting circuit 60. In the embodiment shown in FIG. 19A, the interpolation signal adjusting circuit 60 is constituted by a switch 70. A terminal 71 is coupled to the output the interpolation signal generating circuit 44, and a terminal 72 is coupled to the resistor 45. The output detection signal of the detection circuit 64 is applied to a terminal 73 and is supplied to a control terminal of the switch 70. The switch 70 closes only when the detection signal from the terminal 73 has a high level exceeding a predetermined threshold level, to thereby supply the interpolation signal to the resistor 45. Hence, the hold capacitor 38 is charged and discharged based on the signal prediction only when the reproduced audio signal applied to the terminal 35 has the high slew rate. The hold capacitor 38 performs a simple hold operation when the reproduced audio signal applied to the input terminal 35 has the low slew rate.

FIG. 19B shows another embodiment of the interpolation signal adjusting circuit 60. In FIG. 19B, a terminal 74 is coupled to the output of the interpolation signal generating circuit 44, and a terminal 75 is coupled to the resistor 45. The terminals 74 and 75 are coupled to each other via a resistor R2, and the terminal 75 is grounded via a series circuit comprising a capacitor C2 and a diode D1. A terminal 76 is coupled to the output of the detection circuit 64, and the output detection signal of the detection circuit 64 is supplied to the base of a transistor Q1. When the detection signal has the high voltage Va as shown in FIG. 17(E), a collector current of the transistor Q1 is large and a collector potential of the transistor Q1 is low. Hence, a collector current of a transistor Q2, that is, a current flowing through diodes D1 and D2, is small and an internal resistance of the diode D1 is large. For this reason, a lowpass filter constituted by the resistor R2, the capacitor C2 and the diode D1 has a small attenuation with respect to the high frequencies. In other words, the circuit shown in FIG. 19B does not attenuate the high frequency component of the interpolation signal which has the waveform shown in FIG. 17(F) and is supplied to the terminal 74, and the interpolation signal shown in FIG. 17(G) is obtained from the terminal 75.

When the detection signal becomes the low voltage Vb as shown in FIG. 18(E), the collector potential of the transistor Q1 rises, the collector current of the transistor Q2 increases and the internal resistance of the diode D1 becomes small. As a result, the attenuation of the lowpass filter constituted by the resistor R2, the capacitor C2 and the diode D1 with respect to the high frequencies becomes large. Therefore, the high frequency component of the interpolation signal shown in FIG. 18(F) is attenuated, and the interpolation signal having the waveform shown in FIG. 18(G) is obtained from the terminal 75.

Accordingly, when the reproduced audio signal applied to the input terminal 35 shown in FIG. 16 has the high slew rate as shown in FIG. 17(A), the reproduced audio signal shown in FIG. 17(H) is obtained from the output terminal 43. In this case, compared to the simple hold operation, the interpolation error is small even when the inconsistency is introduced in the slope prediction due to the high frequency noise component in the reproduced audio signal. On the other hand, when the reproduced audio signal applied to the input terminal 35 has the low slew rate as shown in FIG. 18(A), the reproduced audio signal shown in FIG. 18(H) is obtained from the output terminal 43. In this case, the output interpolation signal of the interpolation signal generating circuit 44 is attenuated in the interpolation signal adjusting circuit 60, and the interpolation error is effectively reduced compared to the conventional case shown in FIG. 15(D).

In the case where the resistor R2 is 3.3 k$\Omega$, the capacitor C2 is 3900 pF and the internal resistance of the diode D1 is denoted by $R_D$ in the interpolation signal adjusting circuit shown in FIG. 19B, the gain versus frequency characteristic of the interpolation signal adjusting circuit becomes as indicated by a solid line Ia in FIG. 20 when the detection signal has a high voltage and the internal resistance $R_D$ is 100 k$\Omega$. As the value of the detection signal decreases and the internal resistance $R_D$ takes the values of 10 k$\Omega$, 1 k$\Omega$ and 100$\Omega$, the gain versus frequency characteristic of the interpolation signal adjusting circuit changes as indicated by a phantom line IIa, a one-dot chain line IIIa and a two-dot chain line IVa in FIG. 20. In other words, in the circuit shown in FIG. 19B, the attenuation is performed depending on the detection signal for the interpolation signal having the high frequencies of over 100 kHz. However, in the mid frequencies of 2 kHz to 30 kHz, the attentuation dependent on the detection signal is not performed.

A large portion of the circuit shown in FIG. 16 may be produced in the form of an intergrated circuit (IC). In the case where the circuit construction shown in FIG. 19B is used for the interpolation signal adjusting circuit 60, the transistors Q1 and Q2, the diodes D1 and D2 and the like are provided in the IC, but the resistor R2 and the capacitor C2 are externally coupled to the IC. As a result, the terminal 74 and the anode of the diode D1 must be provided on the IC, that is, two output terminals must be provided on the IC.

Accordingly, another embodiment of the interpolation signal adjusting circuit is shown in FIG. 21. The interpolation signal adjusting circuit 60 shown in FIG. 16 comprises a variable impedance circuit 81 provided within a semiconductor integrated circuit (IC) 80, and a capacitor 82 externally coupled to the semiconductor IC 80. A terminal 83 which is applied with the output interpolation signal of the interpolation signal generating circuit 44 is coupled to an external output terminal 84 of the semiconductor IC 80 via a resistor R3. In addition, the anode of a diode D3 and the cathode of a diode D5 are coupled to the terminal 83. The anode of a diode D4 and the cathode of a diode D6 are coupled to terminal 84.

A terminal 85 which is applied with the output detection signal of the detection circuit 64 is coupled to the collector and the base of a transistor Q3 via a resistor R4. The base of the transistor Q3 is coupled to the bases of transistors Q4 and Q5, and the emitters of the transistors Q3, Q4 and Q5 are grounded. The collector of the transistor Q4 is coupled to the collector and the base of a transistor Q6, and is also coupled to the base of a transistor Q7. The collector of the transistor Q5 is coupled to the cathodes of the diodes D3 and D4. The emitters of the transistors Q6 and Q7 are supplied with the power source voltage Vcc, and the collector of the transistor Q7 is coupled to the anodes of the diodes D5 and D6. The transistors Q3 through Q7 constitute a current mirror circuit, and collector currents i5 and i7 of the respective transistors Q5 and Q7 are equal to a current i flowing to the resistor R4 from the terminal 85.

When the detection signal applied to the terminal 85 has the high voltage Va as shown in FIG. 17(E), the current i (=i5=i7) is large, the impedances of the diodes D3 through D6 are low, and the impedance of the variable impedance circuit 81 between the terminals 83 and 84 is low. On the other hand, when the detection signal applied to the terminal 85 becomes the low voltage Vb as shown in FIG. 18(E), the current i becomes small, the impedances of the diodes D3 through D6 become large, and the impedance of the variable impedance circuit 81 between the terminals 83 and 84 becomes high.

The output terminal 84 is grounded via the capacitor 82. It is not essential for one terminal of the capacitor 82 to be grounded to the ground (earth) level as long as an A.C. grounding is performed with respect to one terminal of the capacitor 82. In addition, the output terminal 84 is coupled to the resistor 45 shown in FIG. 16 via a terminal 86.

The variable impedance circuit 81 and the capacitor 82 constitute a variable lowpass filter. In the case where the capacitor 82 is 3900 pF and an impedance Rv of the variable impedance circuit 81 takes the values of 100 Ω, 330 Ω, 1 kΩ and 3.3 kΩ, the gain versus frequency characteristic of the interpolation signal adjusting circuit shown in FIG. 21 changes as indicated by a solid line Ib, a phantom line IIb, a one-dot chain line IIIb and a two-dot chain line IVb in FIG. 22. In other words, the interpolation signal adjusting circuit shown in FIG. 21 operates as a variable lowpass filter having a cutoff frequency which becomes higher as the slew rate of the input reproduced audio signal becomes higher. For this reason, the interpolation signal is also attenuated depending on the detection signal (the slew rate of the input reproduced audio signal) in the mid frequencies of 2 kHz to 30 kHz shown in FIG. 22. As a result, the error in the interpolation signal can be made extremely small especially for the input reproduced audio signal having the low slew rate, and an optimum noise reduction can be performed.

The resistor 45 and the hold capacitor 38 shown in FIG. 16 are coupled externally to the semiconductor IC 80. Hence, when provided the intepolation signal adjusting circuit shown in FIG. 21 within the semiconductor IC 80, the number of output terminals of the semiconductor IC 80 does not increase, and only the single output terminal 84 is required.

Next, description will be given with respect to a fourth embodiment of the noise reduction circuit according to the present invention. FIG. 23 shows the circuit system of the fourth embodiment. In FIG. 23, those parts which are the same as those corresponding parts in FIG. 16 are designated by the same reference numerals, and description thereof will be omitted. In FIG. 23, the interpolation signal generating circuit 44 is constituted by highpass filters 44a and 44b which are differentiating circuits.

FIG. 24 shows an embodiment of the interpolation signal generating circuit 44 shown in FIG. 23. In FIG. 24, a signal applied to a terminal 90 is passed through a highpass filter part (differentiating circuit part) which has a cutoff frequency of 20 kHz, for example, and is constituted by a capacitor C3 and resistors R5 and R6. An output signal of this highpass filter part within the highpass filter 44a is supplied to a non-inverting input terminal of an operational amplifier 91. The highpass filter part also has a predetermined gain in the low frequency band because of the provision of the resistor R5. The operational amplifier 91 constitutes a non-inverting amplifier together with resistors R7 and R8. The signal amplified in the operational amplifier 91 is supplied to a terminal 92 and to a resistor R9 of the highpass filter 44b. The highpass filter 44b is constituted by resistors R9 and R10 and a capacitor C4, and the cutoff frequency of the highpass filter 44b is several times that of the highpass filter 44a, for example. Hence, the interpolation signal generating circuit 44 as a whole has a highpass type frequency characteristic with a cutoff frequency which is extremely high compared to the upper limit of the audio-frequency band. An output signal of the highpass filter 44b is supplied to a terminal 93 and is supplied to the interpolation signal adjusting circuit 60 as the interpolation signal. The signal from the terminal 92 described before is supplied to the detection signal 64 shown in FIG. 23. In the circuit shown in FIG. 23, a portion of the interpolation signal generating circuit 44 is commonly used as a portion of the hold circuit 26C and a portion of a slew rate detection circuit 101.

Furthermore, the output detection signal of the detection circuit 64 is supplied to the interpolation signal adjusting circuit 60 and to a non-inverting input terminal of a comparator 94. A reference voltage from a variable resistor 97 is supplied to an inverting input terminal of the comparator 94. The comparator 94 generates a signal having an approximate voltage of Vcc when the voltage of the detection signal is higher than the reference voltage, and generates a signal having the earth level when the voltage of the detection signal is lower than the reference voltage. An output signal of the comparator 94 is passed through a resistor 95 and a diode 96 within a hold signal generating circuit 27D, and is supplied to a connection point of the resistor 41 and the capacitor 42.

When the input reproduced audio signal has the high slew rate as shown in FIG. 17(A), the detection signal has the high voltage Va as shown in FIG. 17(E), and the diode 95 is turned ON. Hence, the time constant of the monostable multivibrator 40 is determined by the parallel resistance of the resistors 41 and 96 and the capacitance of the capacitor 42. In this case, the low level period of the output hold signal of the monostable multivibrator 40 is shorter than the predetermined time period T1. On the other hand, when the input reproduced audio signal has the low slew rate as shown in FIG. 18(A), the detection signal has the low voltage Vb as shown in FIG. 18(E), and the diode 95 is turned OFF. In this case, the low level period of the output hold signal of the monostable multivibrator 40 is equal to the predetermined time period T1. In this manner, it is possible to obtain a hold signal having an optimum pulse width depending on the slew rate of the input reproduced audio signal, and the error introduced by the hold operation is kept down to a minimum. The hold signal generating circuit 27D shown in FIG. 23 is essentially the same as the hold signal generating circuit 27C shown in FIG. 11. In the circuit shown in FIG. 23, the detection signal is commonly used as the control signal for the interpolation signal adjusting circuit 60 and as the control signal for the monostable multivibrator 40.

Further, the present invention is not limited to these embodiments, but various variations and modifications may be made without departing from the scope of the present invention.

What is claimed is:

1. A noise reduction circuit for reducing pulse noise in a reproduced audio signal which is reproduced from a recording medium by use of rotary heads, said noise reduction circuit comprising:
   a first input terminal applied with a pulse signal proportional to a rotation of the rotary heads;
   a second input terminal applied with said reproduced audio signal;
   a hold signal generating circuit for generating a hold signal based on the pulse signal from said first input terminal;
   a hold circuit supplied with the reproduced audio signal from said second input terminal and the hold signal from said hold signal generating circuit for successively producing the reproduced audio signal with a predicted level other than a level of the pulse noise included in the reproduced audio signal during a time period corresponding to a pulse width of the hold signal;
   a slew rate detecting circuit for detecting from the output signal of said hold circuit a slew rate of the reproduced audio signal, and for producing a detection signal depending on the detected slew rate, said detection signal being supplied to said hold signal generating circuit and variably controlling the pulse width of the hold signal so that the pulse width of the hold signal becomes narrow as the detected slew rate becomes high; and
   an output terminal supplied with the output signal of said hold circuit for supplying an output reproduced audio signal in which the pulse noise has been eliminated.

2. A noise reduction circuit as claimed in claim 1 in which said hold circuit holds the reproduced audio signal at a level immediately before the pulse noise occurs, so that said predicted level is constant during the time period corresponding to the pulse width of the hold signal.

3. A noise reduction circuit as claimed in claim 1 in which said slew rate detecting circuit comprises a filter circuit supplied with the output signal of said hold circuit for filtering a high frequency component thereof, and a detection circuit for producing said detection signal by detecting an output signal of said filter circuit.

4. A noise reduction circuit as claimed in claim 1 in which said hold circuit comprises an interpolation signal generating circuit for generating an interpolation signal by predicting from a level of the reproduced audio signal immediately before the pulse noise occurs a next level of the reproduced audio signal, said hold circuit successively holding the level of the reproduced audio signal at the predicted level which successively changes during the time period corresponding to the pulse width of the hold signal depending on the interpolation signal.

5. A noise reduction circuit as claimed in claim 4 in which said slew rate detecting circuit comprises a detection circuit for producing another detection signal by detecting the interpolation signal from said interpolation signal generating circuit, and a comparator for comparing a level of said other detection signal and a reference level and for producing as as said detection signal a pulse signal having high and low levels depending on the compared result.

6. A noise reduction circuit as claimed in claim 5 in which said hold circuit further comprises an interpolation signal adjusting circuit for adjusting the interpolation signal based on said other detection signal from said detection circuit.

7. A noise reduction circuit as claimed in claim 6 in which said interpolation signal adjusting circuit comprises a switching circuit for passing the interpolation signal only when the level of said other detection signal exceeds a predetermined threshold level, said hold circuit successively holding the reproduced audio signal at the predicted level only when the interpolation signal is obtained through said switching circuit and in other cases holding the reproduced audio signal at a level immediately before the pulse noise occurs.

8. A noise reduction circuit as claimed in claim 6 in which said interpolation signal adjusting circuit comprises a variable lowpass filter circuit having a variable cutoff frequency which becomes high as the slew rate becomes high depending on said other detection signal.

9. A noise reduction circuit as claimed in claim 8 in which said variable lowpass filter circuit comprises a variable impedance circuit having a variable impedance which becomes small with respect to said interpolation signal supplied thereto as a level of a high frequency component in the reproduced audio signal becomes small depending on said other detection signal, and a capacitor coupled between an output terminal of said variable impedance circuit and an A.C. ground.

10. A noise reduction circuit as claimed in claim 4 in which said interpolation signal generating circuit comprises a first highpass filter supplied with the output signal of said hold circuit and a second highpass filter supplied with an output signal of said first highpass filter for producing said interpolation signal, said slew rate detecting circuit comprising a detection circuit for producing another detection signal by detecting the output signal of said first highpass filter and a comparator for comparing a level of said other detection signal and a reference level and for producing as said detection signal a pulse signal having high and low levels depending on the compared result.

11. A noise reduction circuit for reducing pulse noise in a reproduced audio signal which is reproduced from a recording medium by use of rotary heads, said noise reduction circuit comprising:
   a first input terminal applied with a pulse signal proportional to a rotation of the rotary heads;
   a second input terminal applied with said reproduced audio signal;
   a hold signal generating circuit for generating a hold signal based on the pulse signal from said first input terminal;
   a hold circuit supplied with the reproduced audio signal from said second input terminal and the hold signal from said hold signal generating circuit for successively producing the reproduced audio signal with a predicted level other than a level of the pulse noise included in the reproduced audio signal during a time period corresponding to a pulse width of the hold signal, said hold circuit comprising an interpolation signal generating circuit for generating an interpolation signal by predicting from a level of the reproduced audio signal immediately before the pulse noise occurs a next level of the reproduced audio signal and an interpolation signal adjusting circuit for adjusting the interpolation signal from said interpolation signal generating circuit;
   a slew rate detecting circuit for detecting from the output signal of said hold circuit a slew rate of the reproduced audio signal, and for producing a detection signal depending on the detected slew rate, said detection signal being supplied to said interpolation signal adjusting circuit to control an adjusting operation thereof; and
   an output terminal supplied with the output signal of said hold circuit from supplying an output reproduced audio signal in which the pulse noise has been eliminated.

12. A noise reduction circuit as claimed in claim 11 in which said slew rate detecting circuit comprises a filter circuit supplied with the output signal of said hold circuit for filtering a high frequency component thereof, and a detection circuit for producing said detection signal by detecting an output signal of each filter circuit.

13. A noise reduction circuit as claimed in claim 11 in which said interpolation signal adjusting circuit comprises a switching circuit for passing the interpolation signal only when the level of said detection signal exceeds a predetermined threshold level, said hold circuit successively holding the reproduced audio signal at the predicted level only when the interpolation signal is obtained through said switching circuit and in other cases holding the reproduced audio signal at a level immediately before the pulse noise occurs.

14. A noise reduction circuit as claimed in claim 11 in which said interpolation signal adjusting circuit comprises a variable lowpass filter circuit having a variable cutoff frequency which becomes high as the slew rate becomes high depending on said detection signal.

15. A noise reduction circuit as claimed in claim 14 in which said variable lowpass filter circuit comprises a variable impedance circuit having a variable impedance which becomes small with respect to said interpolation signal supplied thereto as a level of a high frequency component in the reproduced audio signal becomes small depending on said detection signal, and a capacitor coupled between an output terminal of said variable impedance circuit and an A.C. ground.

* * * * *